UNITED STATES PATENT OFFICE.

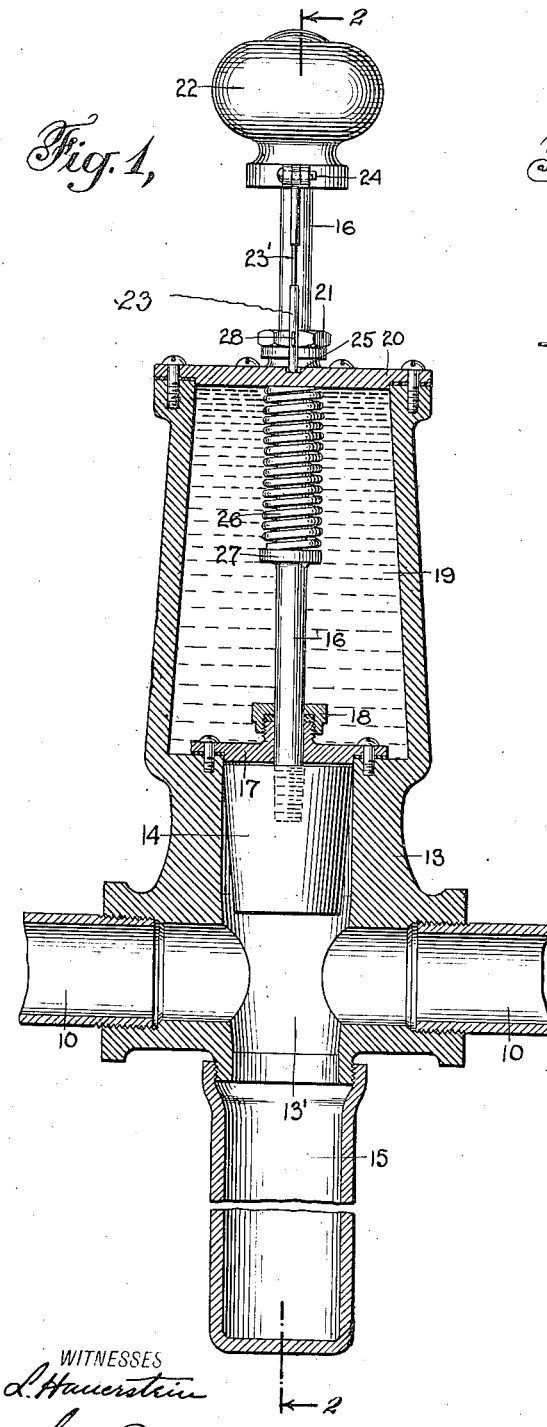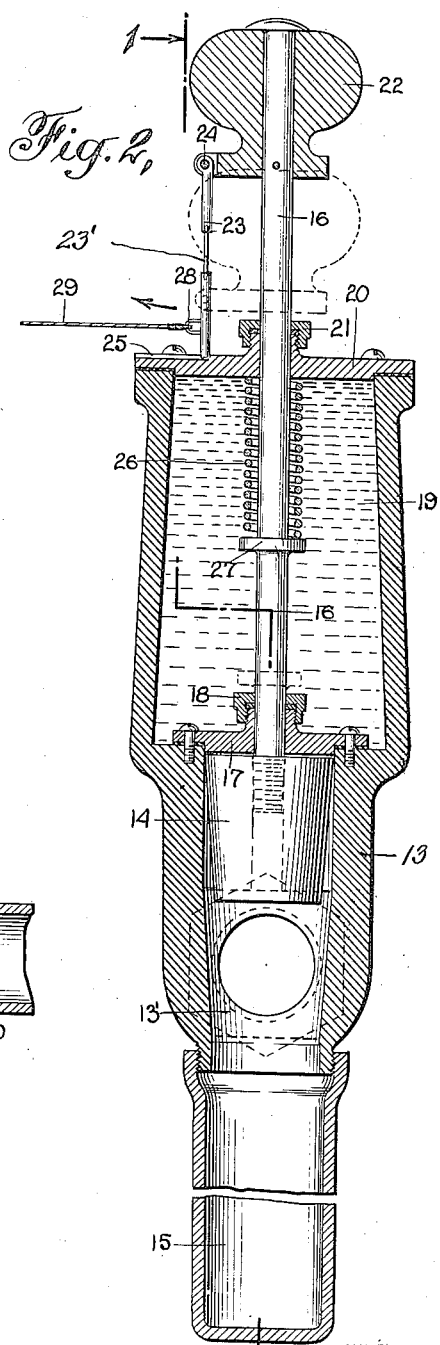

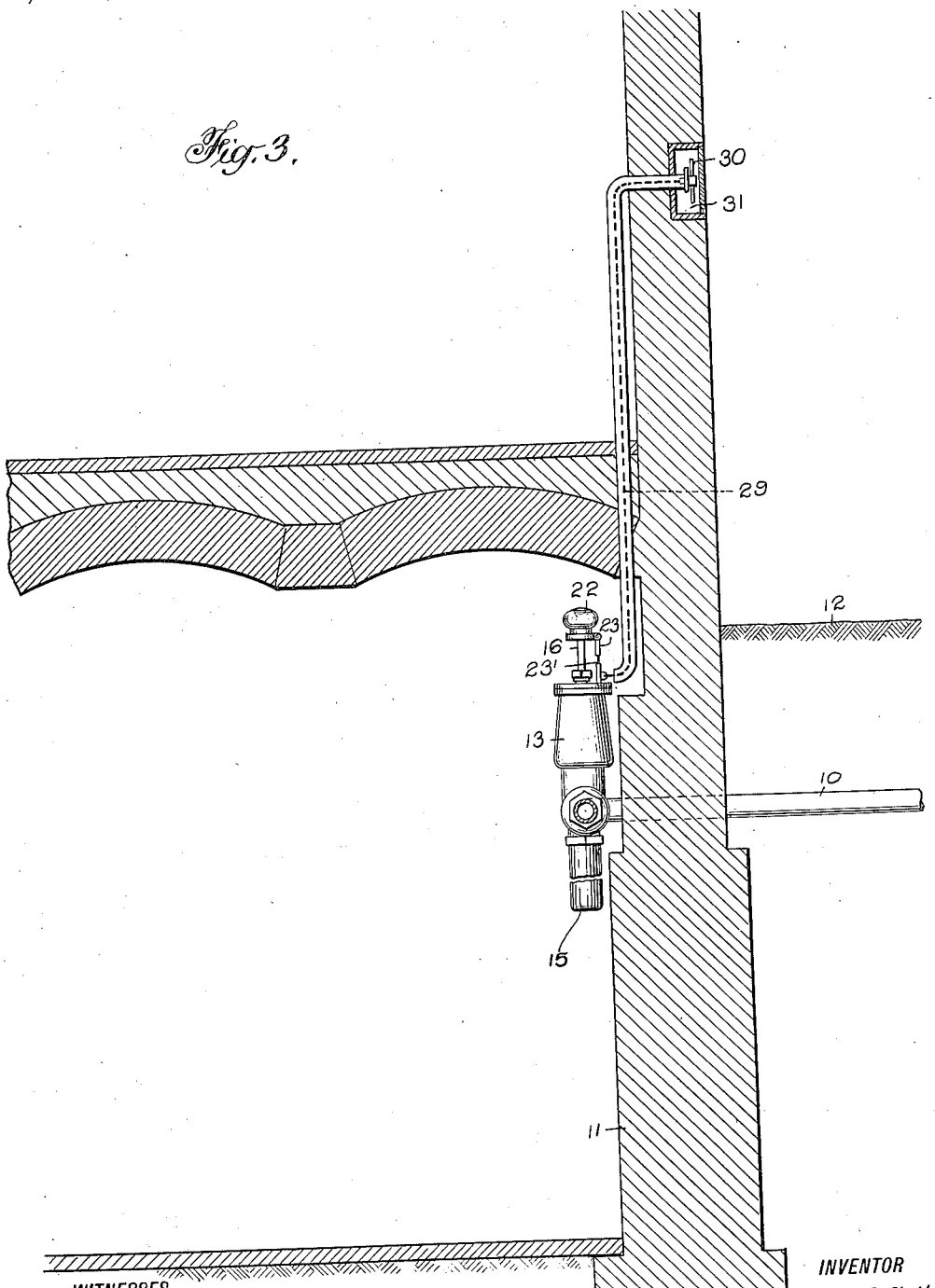

JOSEPH GILLEN, OF NEW YORK, N. Y.

CUT-OFF FOR CONDUITS.

1,172,977.      Specification of Letters Patent.      Patented Feb. 22, 1916.

Application filed July 1, 1915. Serial No. 37,557.

*To all whom it may concern:*

Be it known that I, JOSEPH GILLEN, a citizen of the United States, and a resident of the city of New York, Flushing, borough of Queens, in the county of Queens and State of New York, have invented a new and Improved Cut-Off for Conduits, of which the following is a full, clear, and exact description.

This invention relates to cut-offs for gas pipes or the like and has particular reference to means for shutting off the flow of gas between a street main and the interior of a building in an emergency such as in the case of a fire or the like.

Among the objects of the invention is to provide a cut-off of the character indicated which will be of the most simple and reliable nature with respect to construction and operation and which may be easily manipulated from the inside of a building or from any other desired place as, for instance, on the outside adjacent the street.

More definitely stated, my invention includes a valve casing to which the main pipes are connected on opposite sides and having a valve seat, the valve plug being arranged to drop by gravity so as to obstruct the flow of gas or other fluid through the main.

A further object of the invention is to provide a liquid seal for the movable parts of the device.

The foregoing and other objects of the invention will hereinafter be more fully described and claimed and illustrated in the drawings forming a part of this specification in which like characters of reference indicate corresponding parts in all the views, and in which—

Figure 1 is a vertical sectional view on the line 1—1 of Fig. 2; Fig. 2 is a similar view at right angles to Fig. 1 and on the line 2—2 thereof; and Fig. 3 is a diagrammatic view of the invention applied to a section of a street and building.

The several parts of this device may be made of any suitable materials, and the relative sizes and proportions, as well as the general design of the mechanism, may be varied to a considerable extent without departing from the spirit of the invention hereinafter more fully described and specifically claimed.

By way of illustration of a practical embodiment of this invention, I show a gas pipe 10 leading into a building 11 from the street 12. At any suitable place in or along the pipe 10 is connected a casing 13 having a valve seat 13'. This valve seat is shown slightly tapered and adapted for a valve plug 14 held normally open above the valve seat but adapted to drop by gravity into the seat to obstruct the flow of fluid through the main or pipe 10. To the lower portion of the casing is connected a pit or cistern 15 adapted to receive accumulations of liquid which are not to be conveyed along the pipe 10 and from which cistern the liquid may be removed whenever desired by any suitable means.

The valve 14 is shown connected to a vertical stem 16 extending upwardly through a plate 17 having a packing gland 18 and thence upwardly through a chamber 19 shown as a part of the casing and filled with liquid graphite, oil, or other material, the top of which is closed by means of a plate 20 having a packing gland 21 having preferably solid graphite, making it impossible for the valve to fail to close, due to corrosion or otherwise. The upper end of the stem which projects up from the plate 20 is provided with a handle or knob 22 whereby the valve rod may be lifted, and connected to the knob is a strut 23 preferably pivoted at one end 24 to the knob and having its free end adapted to be seated loosely upon or in a groove 25 of the plate 20. When the knob 22 is lifted, the strut 23 may drop freely into the seat 25 until it is substantially parallel to the stem, when it will sustain the weight of the stem and valve. If desired, in order to expedite the closing of the valve, a spring 26 may be interposed between the inner face of the plate 20 and a collar 27 formed on or secured to the stem 16 within the chamber 19.

Any suitable means may be used to throw the strut out of supporting position. For this purpose I connect to the free end of the strut, as through an eye 28, one or more cords 29 which may lead in any suitable direction or to any desired distance to a handle 30 in a casing 31 where any authorized person, such as an officer or fireman, may have access thereto. Obviously a draft upon the cord 29 will pull the strut 23 out of the position indicated, allowing the valve to drop freely either by gravity alone or by gravity assisted by the spring 26. At 23' I show a section of the strut made of fusible metal, which when subjected to unusually high building temperature will melt and allow the valve to automatically close.

While I show the valve mechanism as adapted especially for use below the street level and for cutting off the flow of gas in the case of a fire, it will be understood that without any substantial change in construction or principle of operation the mechanism may be employed for other purposes as, for instance, to initiate the flow of water from an elevated water tank whereby the water may be caused to flow to be used to extinguish the fire. In this event the valve will be so arranged as to open downwardly either by gravity or with the assistance of the main spring.

I claim:—

1. In a cut-off valve of the nature set forth, the combination of a valve casing providing a valve seat and having an upwardly projecting integral extension constituting a fluid chamber, there being provided a shoulder at the intersection of the fluid chamber and valve casing, a pair of plates at the top and bottom of the fluid chamber, the latter plate being secured upon said shoulder and each plate having a central hole alining with the hole in the other, a reciprocating valve within the casing adapted to seat upon the valve seat, a rigid stem secured to the valve and projecting through the holes in said plates, and detachable means for supporting the valve stem in its elevated position, said supporting means coöperating with the upper plate.

2. In a device of the character set forth, the combination of a casing having a fluid chamber in its upper portion and a valve seat below the same, a plate secured within the casing and separating the fluid chamber from the valve seat, said plate serving to retain a body of fluid above the valve seat, pipes leading to and from the casing on opposite sides of the valve seat, a reciprocating valve in the casing, a rigid stem connected to the valve and leading upwardly through said plate and the fluid in the chamber, a knob secured to the upper end of the stem, and a rigid strut pivoted at one end to the knob and adapted to rest with its other end upon the top of the casing whereby the valve is held elevated from the seat.

JOSEPH GILLEN.

Witnesses:
   DANIEL A. GILLEN,
   ISABELLE GILLEN.